D. H. & E. L. MELTON.
FERTILIZER DISTRIBUTER.
APPLICATION FILED DEC. 13, 1911.

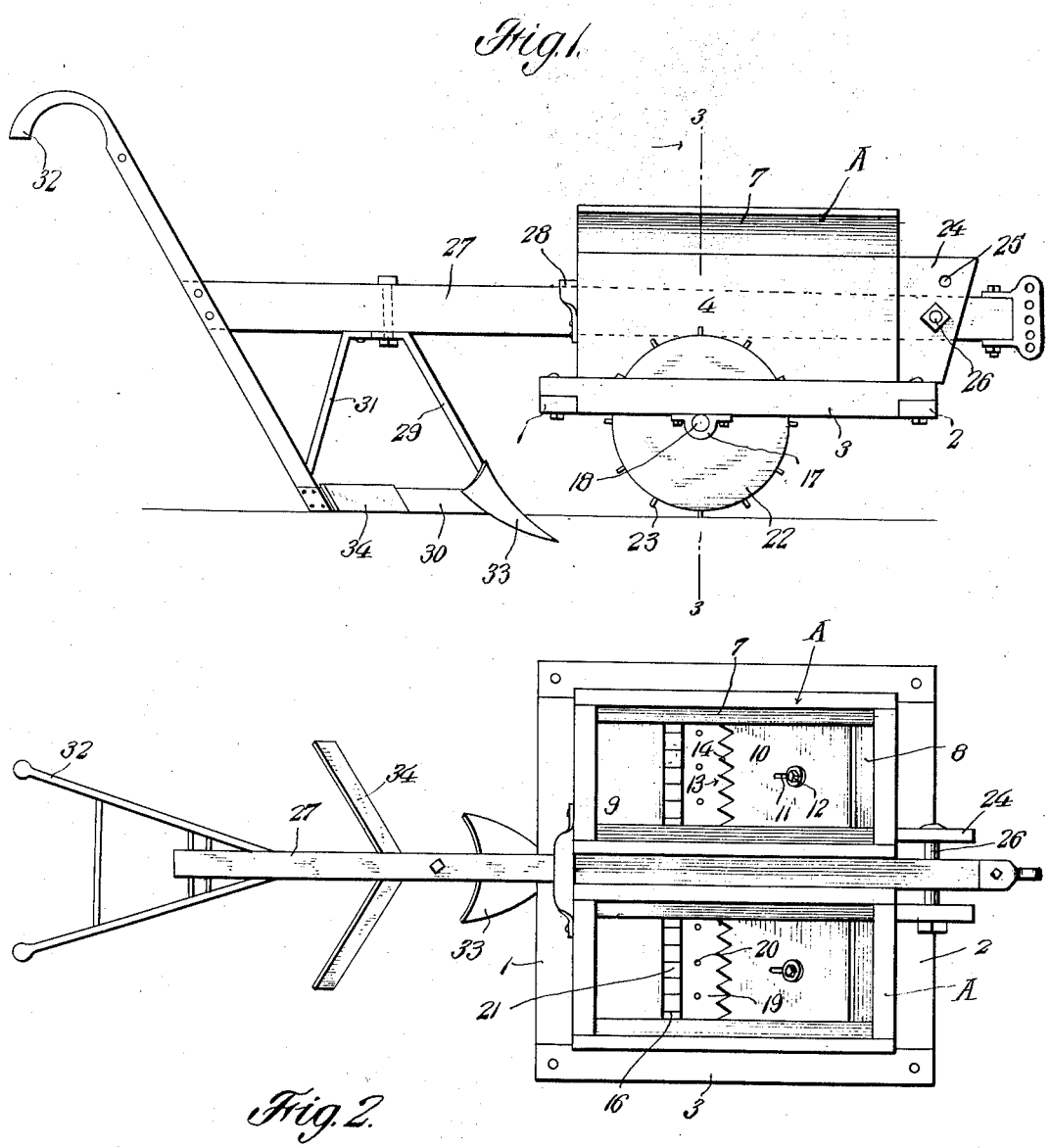

1,043,124.

Patented Nov. 5, 1912.

2 SHEETS—SHEET 2.

Witnesses
J. H. Crawford
Wm. Bagger

Inventor
Daniel H. Melton,
Elias L. Melton.
By Victor J. Evans
Attorney

UNITED STATES PATENT OFFICE.

DANIEL H. MELTON AND ELIAS L. MELTON, OF ENFIELD, NORTH CAROLINA.

FERTILIZER-DISTRIBUTER.

1,043,124.     Specification of Letters Patent.     Patented Nov. 5, 1912.

Application filed December 13, 1911. Serial No. 665,560.

*To all whom it may concern:*

Be it known that we, DANIEL H. MELTON and ELIAS L. MELTON, citizens of the United States, residing at Enfield, in the county of Halifax and State of North Carolina, have invented new and useful Improvements in Fertilizer-Distributers, of which the following is a specification.

This invention relates to fertilizer distributers, and it has for its object to provide a simple and efficient attachment which may be readily applied to and used in connection with an ordinary plow for the purpose of distributing fertilizing material in advance of and adjacent to both sides of the plow in order that said fertilizing material may be covered by the soil overturned by the plow, which is of the ordinary bull tongue type, to be further intermixed and incorporated with the soil by scraping members following in rear of the plow.

A further object of the invention is to provide a fertilizer distributing attachment which may be quickly and conveniently applied to a plow beam to be operated in connection with the plow without interfering with the operation of the latter.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 3:
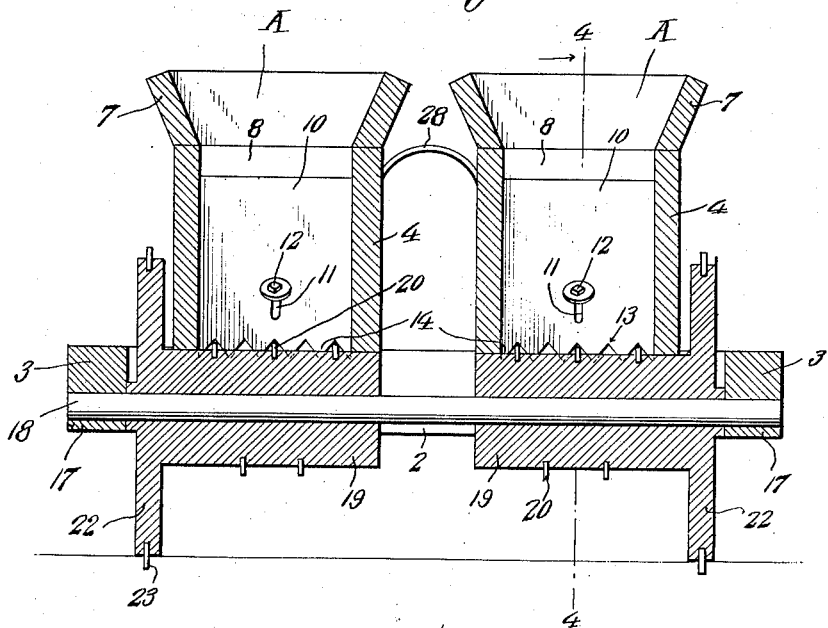
Figure 4:
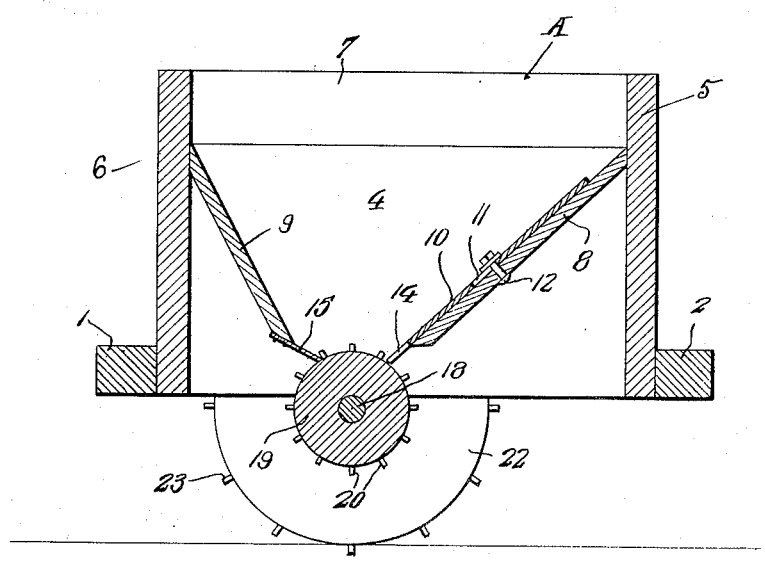

In the drawings,—Figure 1 is a side elevation showing a plow to which the improved fertilizer distributing attachment has been applied. Fig. 2 is a top plan view of the same. Fig. 3 is a transverse sectional view, enlarged, taken through the distributing attachment on the plane indicated by the line 3—3 in Fig. 1. Fig. 4 is a longitudinal sectional view taken on the line 4—4 in Fig. 3.

Corresponding parts in the several figures are denoted by like characters of reference.

A rectangular frame is provided, the same being composed of front and rear members 1, 2 and side members 3, 3. Suitably supported upon the front and rear members of said frame are two similarly constructed hoppers A, A, each of said hoppers consisting of a rectangular box or casing having side members 4, 4 and front and rear members 5, 6, the side members 4, 4 being provided at their upper edges with flaring flanges 7. The front and rear members of the hopper casings are suitably secured to the front and rear members of the frame. Each of the hoppers also includes a downwardly and rearwardly inclined front member 8 and a downwardly and forwardly inclined rear member 9. The inclined front member 8 supports an adjustable gage plate 10 having a slot 11 for the passage of a fastening member, such as a bolt 12, said gage plate being provided at its lower edge with a comb plate 13 having teeth 14. The inclined rear member 9 is provided at its lower edge with a cut-off or brush member 15 which may consist of a strip of leather, rubber or other suitable material having a series of slits 16.

The side members 3 of the frame are provided with boxes 17 for the accommodation of a shaft 18 carrying cylindrical rolls 19, one for each hopper, said cylindrical rolls being disposed adjacent to the spaces between the comb plates 13 and the cut-offs 15. The rolls 19 are provided with spikes 20 arranged to pass between the teeth of the comb plates and also adapted to engage the tongues 21 formed by the slits 16 of the cut-off members 15. Suitably connected with each of the cylindrical rolls 19 is a ground-engaging wheel 22 which, in order to prevent slipping, may be provided with circumferentially disposed ground-engaging teeth or spikes 23.

The side walls 4 at the inner or proximate sides of the hoppers are extended forwardly to form bracket members 24 resting upon the front member 1 of the frame, and said bracket members are each provided with vertically disposed series of perforations 25 for the passage of a transverse bolt 26, whereby the device may be connected with a plow beam 27 which extends longitudinally between the hopper casings. The rear ends of said hopper casings are connected above the plow beam 27 by means of an arch 28 adapted to engage the beam so as to limit the downward movement of the frame and the hopper casings.

The beam 27 carries a stock or standard 29 from which a heel bar or runner 30 extends in a rearward direction, said heel bar being connected with the plow beam by a brace 31. Handles 32 are also provided, the lower ends of said handles being connected with the heel bar, and said handles being also connected with the beam. The standard 29 carries a bull tongue 33 of ordinary construction, and the heel bar is provided at a suitable distance in rear of the bull tongue with rearwardly divergent wings or scrapers 34. In the particular construction of the plow and in the arrangement of the parts thereof no novelty is herein claimed, except in so far as it combines with the fertilizer distributer to coöperate therewith, as will be presently seen.

In the operation of this invention, it will be seen that the fertilizer distributer constitutes an attachment which may be readily applied to the beam of the plow. When thus applied, and the plow is drawn along over the field, the fertilizing material which has been placed in the hoppers will be distributed in two rows which are spaced apart. The plow will engage the ground between the rows of fertilizing material, and the soil upturned by the bull tongue will be displaced to both sides so as to cover the fertilizing material. By the scrapers which follow in rear of the bull tongue, the soil at the sides of the furrow will be broken up and intermixed with the fertilizing material, as will be readily understood. When seed is subsequently planted it will be deposited in the furrow, and the soil from the two sides of the furrow consisting of dirt intermixed with fertilizing material will be moved back into the furrow to cover the seed, thus providing ideal conditions for promoting the germination of the seed and growth of the plant.

When fertilizing material is deposited along with the seed, as is now frequently done, the best results are not attained, the seed being apt to rot before sprouting. This is avoided by the use of the present device which is simple, inexpensive and easily applied to the plow now in ordinary use.

Having thus described the invention what is claimed as new, is:—

1. A fertilizer distributing attachment for plows comprising a frame, two rectangular hoppers supported upon said frame in spaced relation, said hoppers having forwardly extending side members provided with apertures, a plow beam extending between the hoppers, a pivotal member extending through the forwardly extending side members and connecting the same with the plow beam, and dropping devices associated with the hoppers and including ground engaging wheels.

2. In a device of the character described, a frame, rectangular hoppers secured in spaced relation upon said frame and having forwardly extending side members, downwardly inclined convergent front and rear members within the hoppers, gage plates secured adjustably upon the inclined front members and having toothed comb plates, flexible cut-off members secured upon the inclined rear members and having slits forming tongues, a shaft supported by the frame transversely beneath the hoppers, toothed rolls upon said shaft, one of said rolls being provided for each hopper adjacent to the space between the comb plate and the cut-off member, each of said rolls being provided with a ground engaging wheel, an arch member connecting the rear ends of the hoppers, and means for pivotally connecting the projecting front ends of the side members of the hopper with a plow beam.

In testimony whereof we affix our signatures in presence of two witnesses.

DANIEL H. MELTON.
ELIAS L. MELTON.

Witnesses:
  Roy Pike,
  W. E. Beavans.